United States Patent [19]
Hamaguchi et al.

[11] Patent Number: 5,473,587
[45] Date of Patent: Dec. 5, 1995

[54] TRACK RETRIEVAL SYSTEM FOR OPTICAL DISK

[75] Inventors: Shingo Hamaguchi; Yasuyuki Ozawa, both of Kawasaki, Japan

[73] Assignee: Fujitsu Limited, Kawasaki, Japan

[21] Appl. No.: 311,445

[22] Filed: Sep. 23, 1994

Related U.S. Application Data

[63] Continuation of Ser. No. 987,868, Dec. 9, 1992, abandoned.

[30] Foreign Application Priority Data

Dec. 12, 1991 [JP] Japan ..................................... 3-329130

[51] Int. Cl.$^6$ ....................................... G11B 7/00
[52] U.S. Cl. ..................................... 369/44.28; 369/44.32; 360/78.04
[58] Field of Search ........................... 369/54, 58, 44.32, 369/44.28, 44.25, 44.27, 44.28; 360/78.04

[56] References Cited

U.S. PATENT DOCUMENTS

| | | | |
|---|---|---|---|
| 4,663,752 | 5/1987 | Kakuse et al. | 369/54 |
| 5,001,732 | 3/1991 | Nomura et al. | 360/78.04 |
| 5,042,019 | 8/1991 | Kitai et al. | 360/78.04 |
| 5,140,574 | 8/1992 | Cloetens et al. | 360/78.04 |

FOREIGN PATENT DOCUMENTS

| | | |
|---|---|---|
| 0437891A1 | 7/1991 | European Pat. Off. . |
| 0505252A2 | 9/1992 | European Pat. Off. . |
| 2558001 | 7/1985 | France . |
| 63-10382 | 1/1988 | Japan . |
| 1-98169 | 4/1989 | Japan . |
| WO92/01284 | 1/1992 | WIPO . |

OTHER PUBLICATIONS

"Information Technology—130 mm Rewritable Optical Disk Cartridges for Information Interchange", Draft International Standard ISO/IEC DIS 10089.

"Data Interchange on 90 mm Optical Disk Cartridges, Read Only and Rewritable, M.O.", ECMA European Computer Manufacturers Association, ECMA/TC31/91/32, May 10, 1991.

Primary Examiner—Georgia Y. Epps
Assistant Examiner—P. W. Huber
Attorney, Agent, or Firm—Nikaido, Marmelstein, Murray & Oram

[57] ABSTRACT

A track retrieval system retrieves a track of an optical disk based on track cross pulses which correspond to a number of tracks scanned by a scan beam. The track retrieval system includes a pulse shaping circuit for generating a pulse at a zero-crossing of a track error signal which is dependent on a tracking error of the scan beam relative to the track, a masking circuit for outputting track cross pulses by masking an output of the pulse shaping circuit for a predetermined time after the pulse is output from the pulse shaping circuit, so that pulses generated by the pulse shaping circuit within the predetermined time due to chattering are eliminated, a counter for counting the track cross pulses output from the masking circuit and for outputting a counted value, and a control unit for setting the predetermined time in the masking circuit based on a moving speed of the scan beam which is calculated from the counted value output from the counter. A correcting circuit may be provided to output a track cross pulse if the pulse shaping circuit outputs no pulse within a predetermined time, so that a pulse dropout of the track cross pulse is compensated.

22 Claims, 9 Drawing Sheets

TRACK RETRIEVAL SYSTEM FOR OPTICAL DISK

This application is a continuation of application Ser. No. 07/987,868 filed Dec. 9, 1992 now abandoned.

BACKGROUND OF THE INVENTION

The present invention generally relates to track retrieval systems, and more particularly to a track retrieval system for retrieving a track of an optical disk by counting track cross pulses.

An optical disk unit controls access to a track of an optical disk by generating a track cross pulse every time a scan beam moves 1 track or ½ track, for example, and counting the track cross pulses. The track cross pulses are generated based on a track error signal which is dependent on a tracking error of the scan beam relative to the track. For this reason, a chattering easily occurs in the track cross pulses. On the other hand, the track cross pulse easily drops out when the scan beam traverses an address part of the track.

Figure 1:
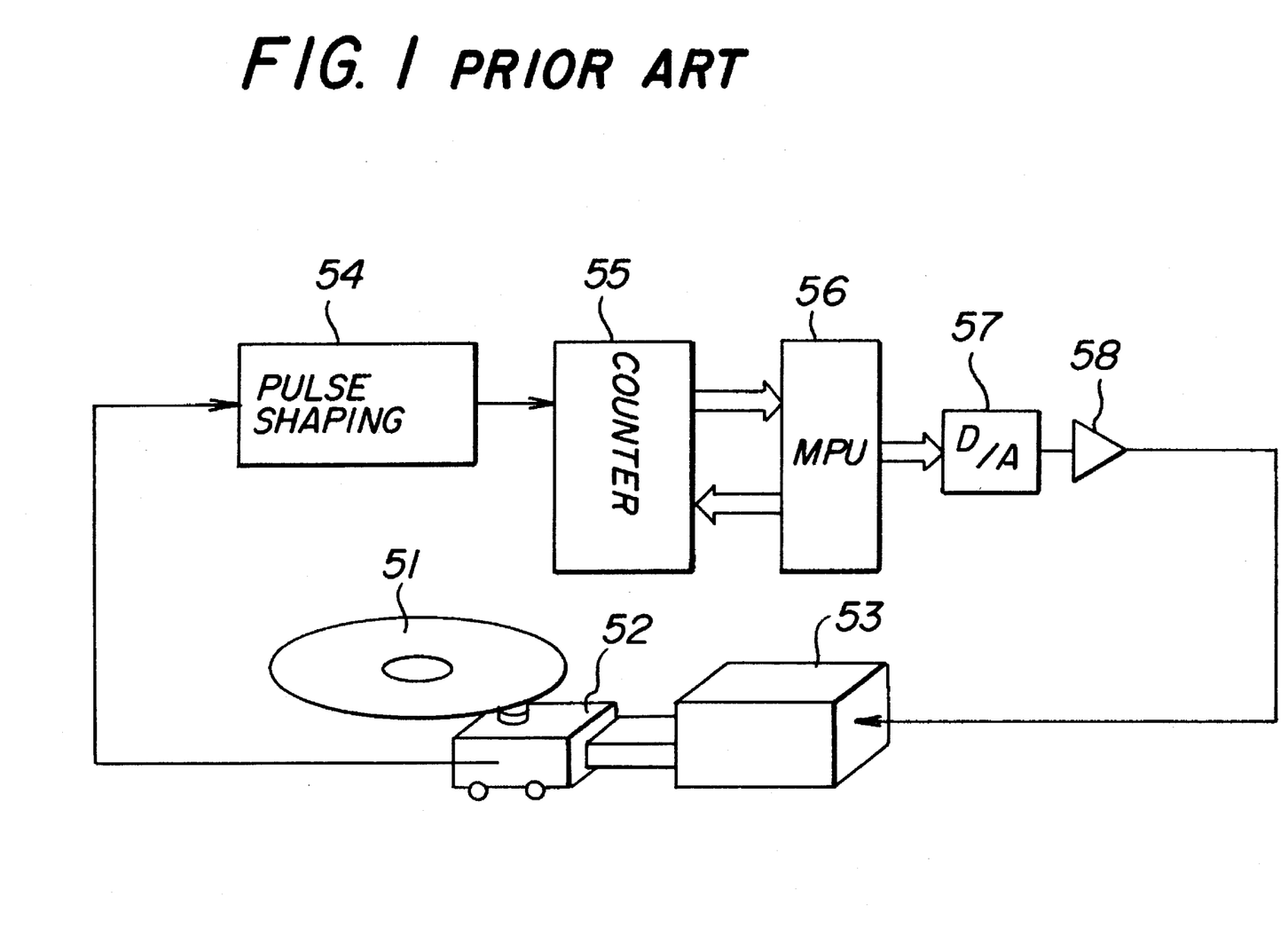
FIG. 1 is a system block diagram showing an example of a conventional track retrieval system.

FIG. 1 shows an example of a conventional track retrieval system. In FIG. 1, an optical disk 51 has concentric tracks or a spiral track formed thereon. An optical pickup 52 is driven by a voice coil motor (VCM) 53 and is moved in a radial direction of the optical disk 51. The optical pickup 52 irradiates a scan beam on the optical disk 51 so as to write/read information to/from the optical disk 51.

For example, the optical disk 51 is in conformance with the standards set by the International Organization for Standardization (ISO) for 130 mm (5-inch) optical disks or, for 90 mm (3.5-inch) optical disks.

A tracking error of the scan beam relative to the track of the optical disk 51 is detected based on the reflected beam from the optical disk 51. A track error signal which indicates this tracking error is output from the optical pickup 52 and is formed into a pulse signal by a pulse shaping circuit 54. Pulses of the pulse signal output from the pulse shaping circuit 54 is counted by a counter circuit 55 as track cross pulses. A microprocessor unit (MPU) 56 controls the VCM 53 via a digital-to-analog (D/A) converter 57 and a power amplifier 58 based on the counted value of the counter circuit 55.

Figure 2:
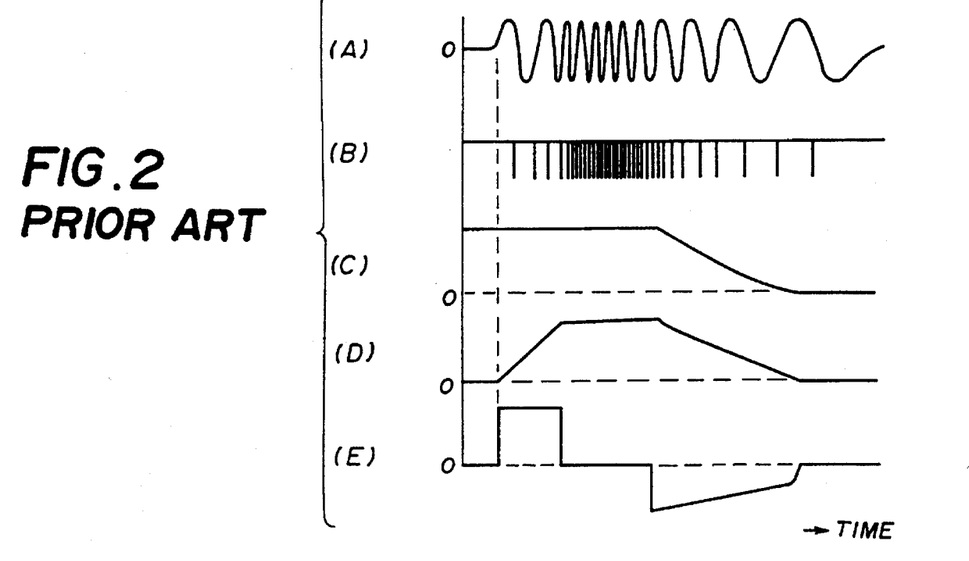
FIG. 2 is a timing chart for explaining the operation of the track retrieval system shown in FIG. 1.

FIG. 2 is a time chart for explaining the operation of the track retrieval system shown in FIG. 1. In FIG. 2, (A) shows the track error signal output from the optical pickup 52, (B) shows the track cross pulses output from the pulse shaping circuit 54, (C) shows a target speed within the MPU 56, (D) shows a calculated speed within the MPU 56, and (E) shows a control signal supplied to the VCM 53.

The counter circuit 55 counts the track cross pulses shown in FIG. 2 (B). The MPU 56 loads a number of tracks to a target track into the counter circuit 55, and the counter circuit 55 subtracts the number of track cross pulses from the loaded number of tracks. The MPU 56 reads the output of the counter circuit 55 at predetermined intervals, and calculates the moving speed of the optical pickup 52 by calculating the position of the optical pickup 52. In addition, the MPU 56 compares the calculated speed and the target speed, and calculates a control quantity of the VCM 53 depending on the position of the optical pickup 52. The control signal shown in FIG. 2 (E) is supplied to the VCM 53 as this control quantity.

Figure 3:
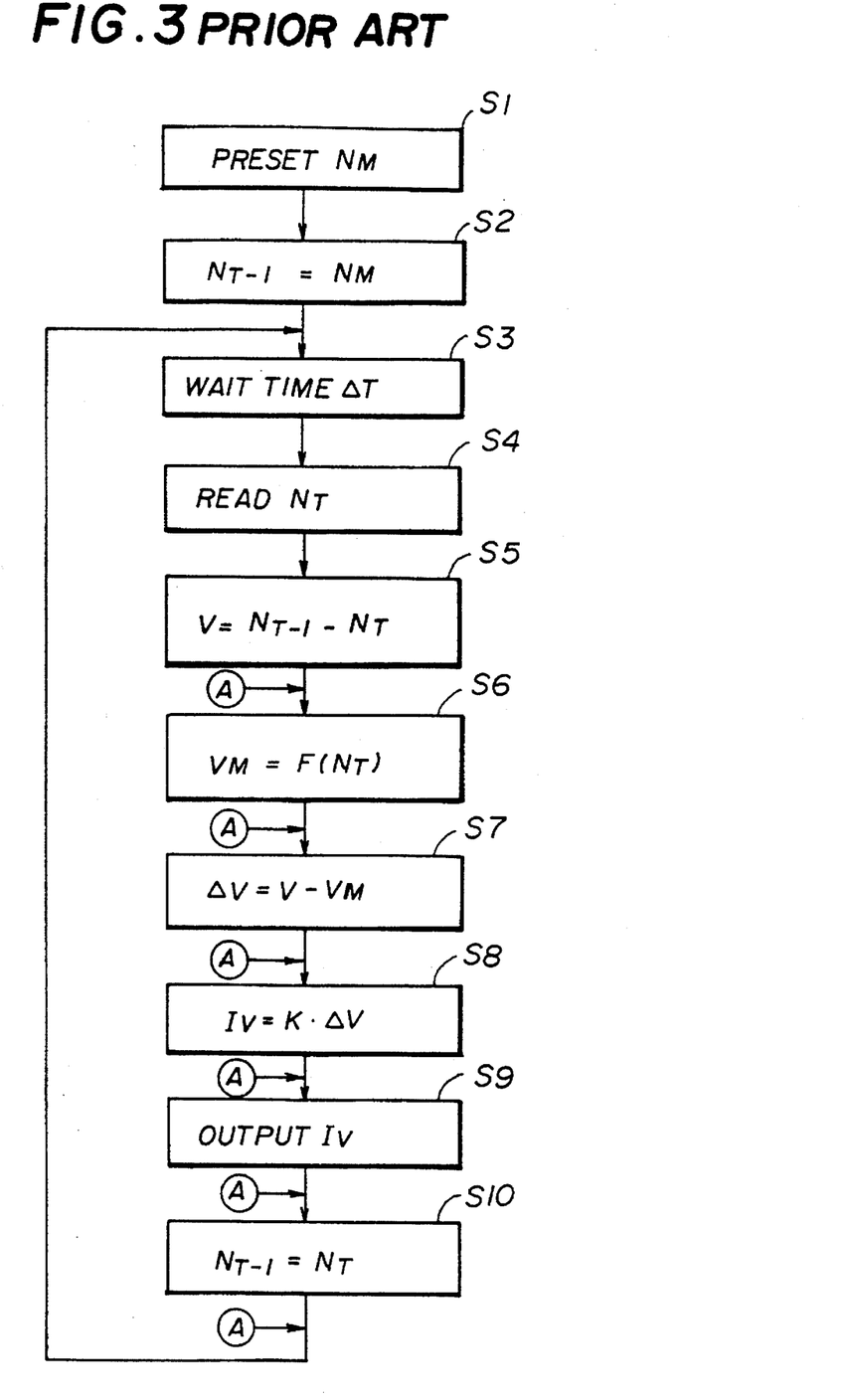
FIG. 3 is a flow chart for explaining the operation of a MPU shown in FIG. 1.

FIG. 3 is a flow chart for explaining the above described operation of the MPU 56. In FIG. 3, a step S1 presets a moving quantity $N_M$ of the optical pickup 52 into the counter circuit 55. This moving quantity $N_M$ is preset from a host controller (not shown) via the MPU 56. Then, a step S2 initializes a counted value $N_{T-1}$ of the counter circuit 55 to $N_M$, and a step S3 waits for a time $\Delta T$.

A step S4 reads the counted value $N_T$ of the counter circuit 55 corresponding to the distance to the target position. A step S5 calculates a moving speed V of the optical pickup 52 based on $V=N_{T-1}-N_T$. A step S6 calculates a target speed $V_M$ based on $V_M=F(N_T)$, where $V_M=F(N_T)$, is stored in a memory (not shown) which is connected to the MPU 56.

A step S7 calculates a speed error $\Delta V$ based on $\Delta V=V-V_M$, and a step S8 calculates a current $I_V$ to be supplied to the VCM 53 based on $I_V=K \times \Delta V$, where K is a predetermined constant. A step S9 outputs the current $I_V$ to the VCM 53 via the D/A converter 57 and the power amplifier 58. Finally, a step S10 updates the counted value $N_{T-1}$ to $N_T$, and the process returns to the step S3.

If one track cross pulse is generated every time the optical pickup 52 (that is, the scan beam) moves 1 track or ½ track, a chattering occurs in which a plurality of pulses are successively generated as the track error signal makes a zero-crossing or, a pulse dropout of the track cross pulses occurs when the scan beam scans the address part and passes a part where no grooves are formed on the optical disk 51.

Figure 4:
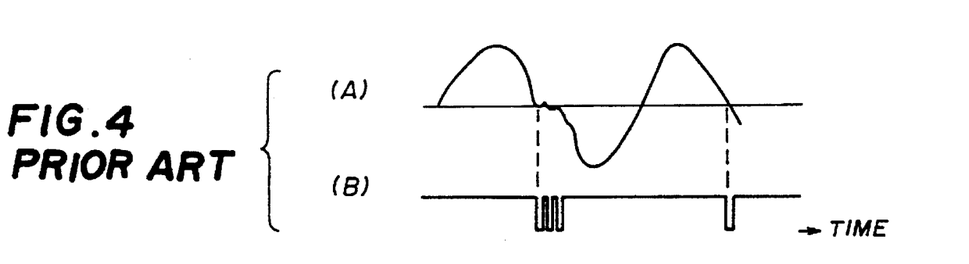
FIG. 4 is a time chart for explaining the chattering.
Figure 5:
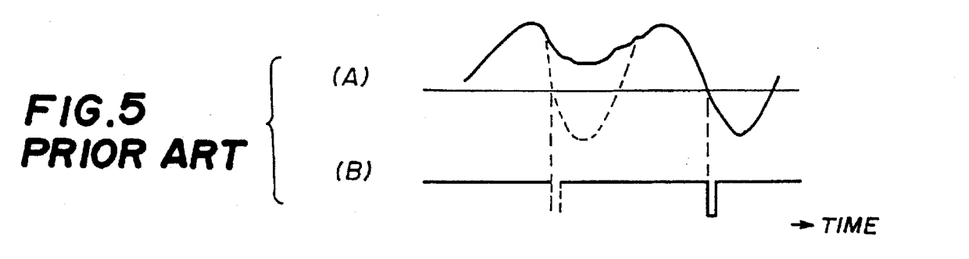
FIG. 5 is a time chart for explaining the pulse dropout of track cross pulses.

The chattering occurs particularly when a comparator compares an analog signal having a relatively low frequency with another signal. On the other hand, the pulse dropout of the track cross pulse occurs particularly when the optical pickup 52 (that is, the scan beam) moves at a high speed. FIG. 4 is a time chart for explaining the chattering, and FIG. 5 is a time chart for explaining the pulse dropout of the track cross pulses. In each of FIGS. 4 and 5, (A) shows the track error signal and (B) shows the track cross pulses.

Next, a description will be given of a conventional method of preventing the chattering, by referring to FIG. 6.

Figure 6:
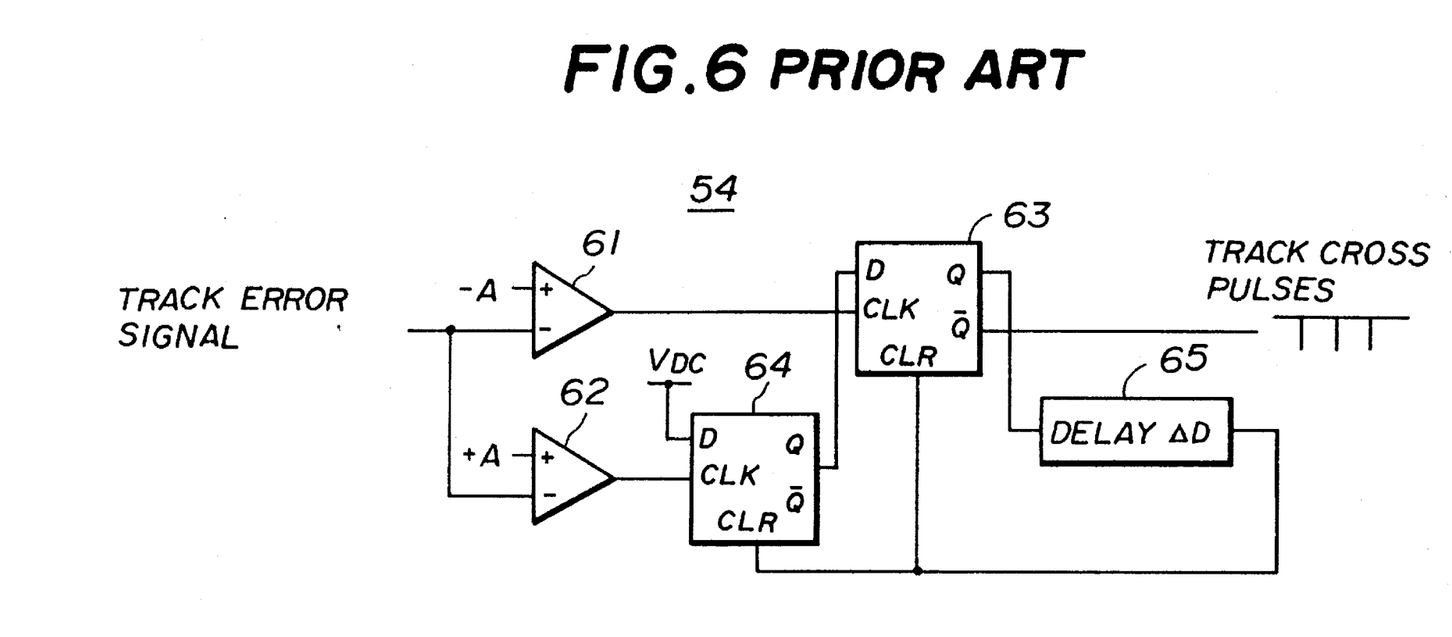
FIG. 6 is a system block diagram showing an example of a pulse shaping circuit shown in FIG. 1.

FIG. 6 shows the pulse shaping circuit 54 which is designed to prevent the chattering. This pulse shaping circuit 54 includes so-called hysteresis comparators 61 and 62, D-type flip-flops 63 and 64, and a delay circuit 65.

The comparator 61 has a non-inverting input terminal for receiving a negative reference voltage −A and an inverting input terminal for receiving the track error signal. The comparator 62 has a non-inverting input terminal for receiving a positive reference voltage +A and an inverting input terminal for receiving the track error signal. An output signal of the comparator 61 is input to a clock terminal CLK of the flip-flop 63, and an output signal of the comparator 62 is input to a clock terminal CLK of the flip-flop 64.

An input terminal D of the flip-flop 64 is connected to a D.C. power source voltage $V_{DC}$, and an output terminal Q of the flip-flop 64 is connected to an input terminal D of the flip-flop 63. A signal output from an output terminal Q of the flip-flop 63 is delayed by a predetermined time $\Delta D$ in the delay circuit 65 before being input to clear terminals CLR of the flip-flops 63 and 64. Hence, track cross pulses prevented of the chattering are output from an output terminal $\overline{Q}$ of the flip-flop 63.

Figure 7:
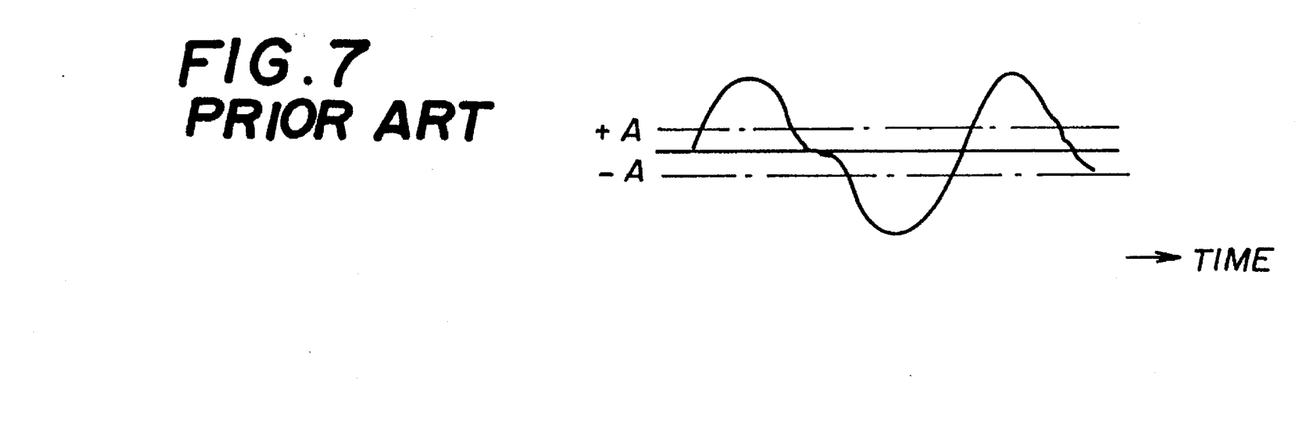
FIG. 7 is a time chart for explaining the operation of the pulse shaping circuit shown in FIG. 6.

As shown in FIG. 7, the pulse shaping circuit 54 shown in FIG. 6 sets two slice levels (reference voltages) +A and −A by the two comparators 61 and 62 having mutually different slice levels. The track cross pulse is generated when the track error signal exceeds one slice level −A after exceeding the other slice level +A.

On the other hand, as a previously proposed method of correcting the pulse dropout of the track cross pulses, there is a method which measures an immediately preceding pulse interval and sets a time based on the measured pulse interval. If no track cross pulse is generated within this set time, it is regarded that a pulse dropout has occurred and one track cross pulse is counted although no track cross pulse exists.

In addition, other methods have also been proposed. For example, a Japanese Laid-Open Patent Application No. 1-98169 proposes a method of correcting the chattering and the pulse dropout, and a Japanese Laid-Open Patent Application No. 63-10382 proposes a method of correcting the pulse dropout.

According to the method proposed in the Japanese Laid-Open Patent Application No. 1-98169, a prohibit circuit is provided. This prohibit circuit supplies a prohibit signal to the counter circuit 55, the MPU 56 and the like during a time in which the optical pickup 52 (scan beam) passes the address part of the optical disk 51 so as to prohibit the counting operation during this time. The MPU 56 calculates the number of tracks passed during the time in which the prohibit signal is output from the prohibit circuit, and directly corrects the counted value of the counter circuit 55 based on the calculated number of tracks.

On the other hand, the method proposed in the Japanese Laid-Open Patent Application No. 63-10382 only corrects the pulse dropout using an integrator. The integrator integrates an output signal of a speed detector which is connected to the VCM 53, and calculates a moved distance of the optical pickup 52 (scan beam) based on the integrated value. If no track cross pulse is generated even after the moved distance exceeds a predetermined distance (distance between tracks), a correction pulse is generated to correct the pulse dropout of the track cross pulse, and at the same time, the integrator is reset.

However, according to the pulse shaping circuit 54 shown in FIG. 6, it is difficult to form this circuit in the form of an integrated circuit (IC) because of the need to provide comparators, variable resistors and the like. As a result, there is a problem in that it is difficult to reduce the size of the pulse shaping circuit 54.

As for the previously proposed method which measures the immediately preceding pulse interval and sets the time based on the measured pulse interval, there is a problem in that it is difficult to set a time which covers a high-speed range in which the optical pickup 52 (scan beam) moves at a high speed of 3 µs/track to a low-speed range in which the optical pickup (scan beam) moves at a low speed of 1 ms/track, for example. If the time were to be set to cover these ranges, it would require approximately 8000 gates to perform the required operations by hardware. Similarly, the same problem would occur if the chattering were to be prevented by setting the time which covers the high-speed range to the low-speed range of the optical pickup 52 (scan beam).

On the other hand, according to the method proposed in the Japanese Laid-Open Patent Application No. 1-98169, the scale of the circuit becomes large if a MPU is independently provided exclusively for making the correction. Further, if the MPU 56 which controls the VCM 53 is also used for making the correction, the MPU 56 must simultaneously process the motor control and the interrupt from the prohibit circuit and the control program of the MPU 56 becomes complex. In addition, a problem occurs if the predicted speed used for the correction is different from the actual speed of the optical pickup 53 (scan beam), because the corrected track cross pulses are input directly to the counter circuit 55. For example, if the actual speed is smaller than the predicted speed, the original track cross pulse is input immediately after one pulse is corrected within the time of the prohibit signal, and there is a problem in that an unnecessary correction is made.

With regard to the method proposed in the Japanese Laid-Open Patent Application No. 63-10382, the error of the speed detector tends to accumulate because the integrator is reset regardless of the track error signal. Moreover, there is a problem in that it is difficult to reduce the size of the circuit because of the need to provide the speed detector and the integrator, particularly since it is difficult to form the integrator in the form of the IC.

SUMMARY OF THE INVENTION

Accordingly, it is a general object of the present invention to provide a novel and useful track retrieval system in which the problems described above are eliminated.

Another and more specific object of the present invention is to provide a track retrieval system for retrieving a track of an optical disk based on track cross pulses which correspond to a number of tracks scanned by a scan beam, comprising pulse shaping means for generating a pulse at a zero-crossing of a track error signal which is dependent on a tracking error of the scan beam relative to the track, masking means, coupled to the pulse shaping means, for outputting track cross pulses by masking an output of the pulse shaping means for a predetermined time after the pulse is output from the pulse shaping means, so that pulses generated by the pulse shaping means within the predetermined time due to chattering are eliminated, counter means, coupled to the masking means, for counting the track cross pulses output from the masking means and for outputting a counted value, and control means, coupled to the counter means, for setting the predetermined time in the masking means based on a moving speed of the scan beam which is calculated from the counted value output from the counter means. According to the track retrieval system of the present invention, it is possible to prevent the undesirable effects of chattering of the track cross pulses and positively correct the pulse dropout of the track cross pulses, by use of a relatively simply circuit.

Other objects and further features of the present invention will be apparent from the following detailed description when read in conjunction with the accompanying drawings.

DESCRIPTION OF THE PREFERRED EMBODIMENTS

Figure 8:
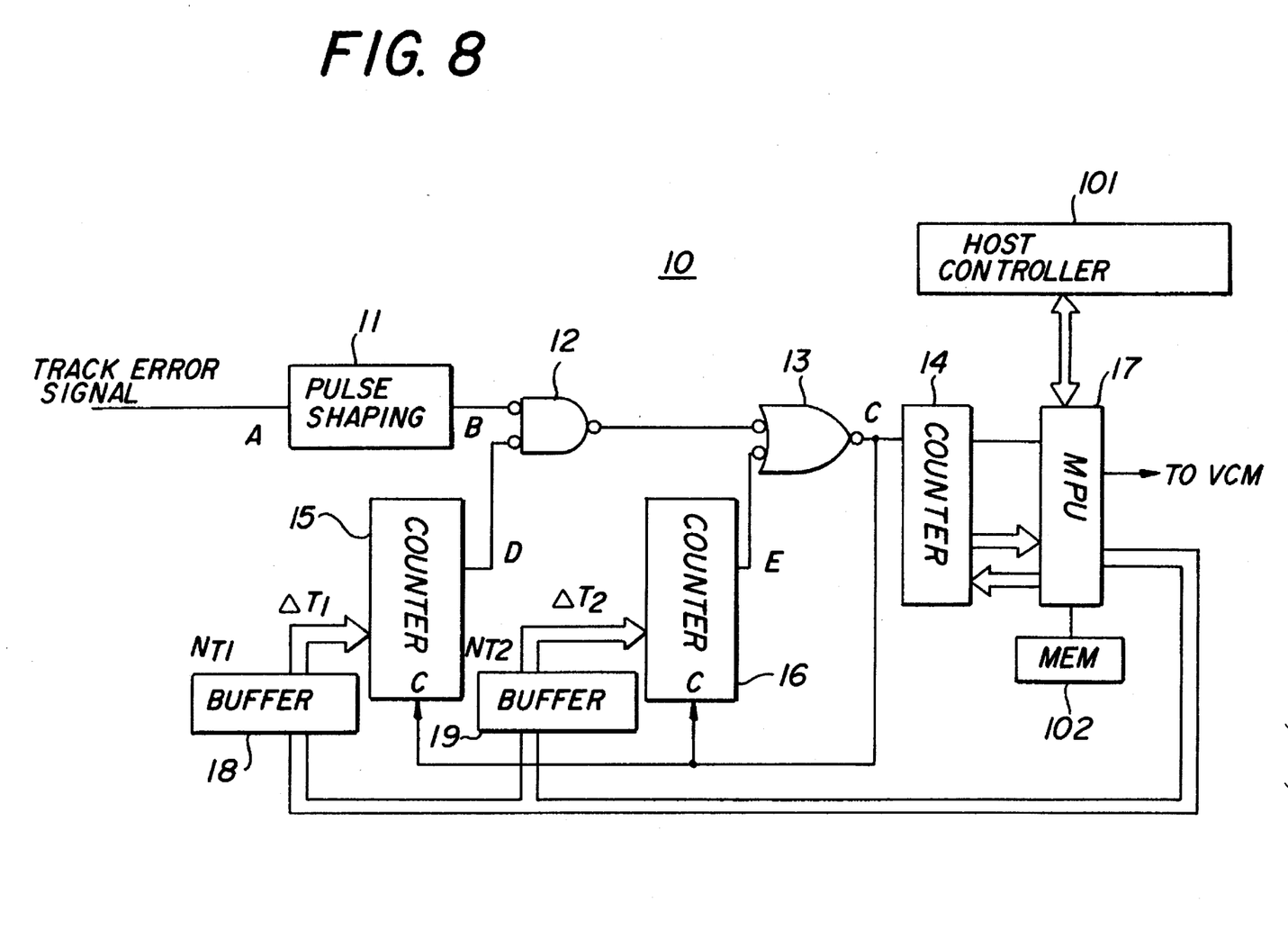
FIG. 8 is a system block diagram showing a first embodiment of a track retrieval system according to the present invention.
Figure 9:
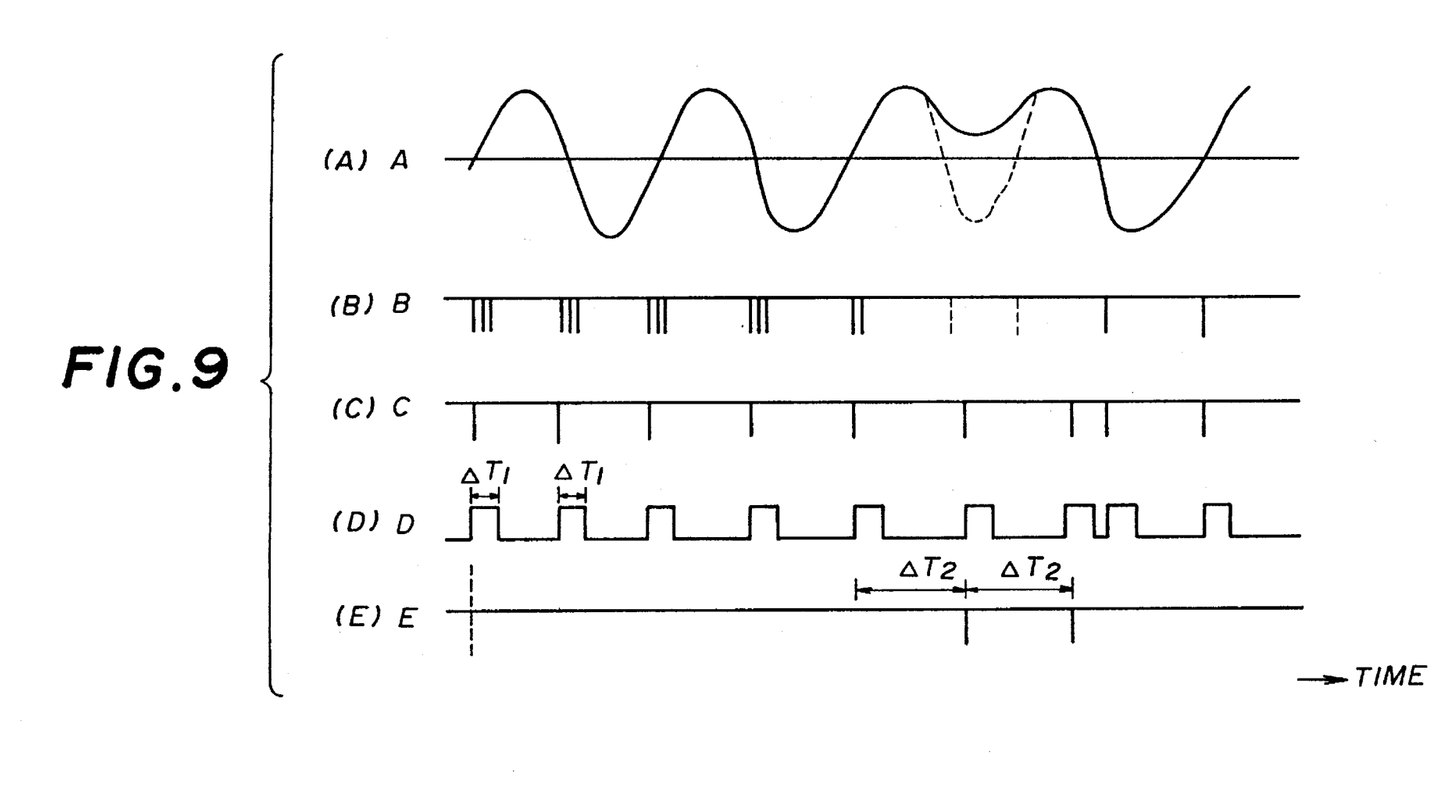
FIG. 9 is a time chart for explaining the operation of the first embodiment.

A description will be given of a first embodiment of a track retrieval system according to the present invention, by referring to FIGS. 8 and 9. FIG. 8 shows the first embodiment, and FIG. 9 is a time chart for explaining the operation of this first embodiment.

In a track retrieval system 10 shown in FIG. 8, a track error signal is input to a pulse shaping circuit 11. This track error signal is obtained from the optical pickup 52 shown in FIG. 1, for example. In other words, when the optical pickup 52 is driven by the VCM 53 and the scan beam output from the optical pickup 52 moves in the radial direction of the optical disk 51 having the concentric tracks or the spiral track formed thereon, the track error signal is output from the optical pickup 52 as a detection signal of the track.

An output signal of the pulse shaping circuit 11 is input to one input terminal of a NAND circuit 12, and an output signal of the NAND circuit 12 is input to one input terminal of a NOR circuit 13. An output signal of the NOR circuit 13 is input to a pulse counter 14 as track cross pulses. In addition, the output track cross pulses of the NOR circuit 13 are also input to count terminals C of counters 15 and 16. The counter 15 is provided for masking, and the counter 16 is provided for correcting.

The pulse counter 14 and a MPU 18 are mutually connected. The MPU 17 inputs the counted value output from the pulse counter 14, and also outputs a reset signal and the like. IN addition, the MPU 17 controls the VCM 53 which drives the optical pickup 52, and also sets times for the masking and correction.

An initial value $N_{T1}$ of the masking time set in the MPU 17 is output to a buffer 18, and an initial value $N_{T2}$ of the correcting time set in the MPU 17 is output to a buffer 19. The buffers 18 and 19 respectively hold the initial values $N_{T1}$ and $N_{T2}$ until a next setting is made from the MPU 17. The buffer 18 outputs the initial value $N_{T1}$ to the counter 15, and the buffer 19 outputs the initial value $N_{T2}$ to the counter 16.

An output of the counter 15 is input to the other input terminal of the NAND circuit 12, and an output of the counter 16 is input to the other input terminal of the NOR circuit 13.

In this case, the NAND circuit 12, the counter 15 and the buffer 18 form a masking means. On the other hand, the NOR circuit 13, the counter 16 and the buffer 19 form a correcting means. This embodiment includes both the masking means and the correcting means, but it is of course possible to provide them independently.

As will be described later, a host controller 101 and a memory 102 are connected to the MPU 17. For example, the memory 102 is a read only memory (ROM).

Next, a description will be given of the operation of this embodiment with reference to FIG. 9, assuming that a negative logic is employed.

First, the MPU 17 outputs the initial value $N_{T1}$ of the masking time to the buffer 18 to be stored therein based on the counted value output from the pulse counter 14. The buffer 18 sets the counter 15. In addition, the MPU 17 outputs the initial value $N_{T2}$ of the correcting time to the buffer 19 to be stored therein. The buffer 19 sets the counter 16.

The track error signal A shown in FIG. 9 (A) is output from the optical pickup 52 and is input to the pulse shaping circuit 11. A part of this track error signal A indicated by the dotted line corresponds to the pulse dropout which occurs when the optical pickup 52 (scan beam) scans the address part of the track on the optical disk 51.

The pulse shaping circuit 11 generates the track cross pulses shown in FIG. 9 (B) at the zero-crossings of the track error signal. The chattering occurs in the vicinity of the zero level of the track error signal, and a plurality of pulses are generated at in the vicinity of this zero level. Out of these plurality of pulses, the first pulse is output via the NAND circuit 12 and the NOR circuit 13 as the track cross pulse, as shown in FIG. 9 (C). The track cross pulse output from the NOR circuit 13 is counted by the pulse counter 14. At the same time, the counter 15 starts to count down, and the count down stops when the count of the counter 15 becomes zero.

The counter 15 outputs a high-level signal when the count thereof is other than zero, and otherwise outputs a low-level signal. Accordingly, when the track cross pulse is input to the counter 15, the counter 15 outputs a high-level signal to the NAND circuit 12. In other words, when the track cross pulse is input to the counter 15, the NAND circuit 12 is masked as shown in FIG. 9 (D) for a time $\Delta T_1$ until the count in the counter 15 becomes zero and the count down stops. The time $\Delta T_1$ is the time it takes for the initial value $N_{T1}$ to become zero by the count down or subtraction.

Accordingly, the NAND circuit 12 is masked, and the pulses which are generated after the first pulse by the chattering is eliminated by the NAND circuit 12.

On the other hand, the counter 16 starts to count down simultaneously as the counter 15, and stops the count down when the count thereof becomes zero. The counter 16 generates a negative pulse shown in FIG. 9 (E) when the count in the counter 16 becomes 1, and this negative pulse is input to the pulse counter 14 via the NOR circuit 13 as the track cross pulse.

In other words, if a time $\Delta T_2$ elapses from the time when the track cross pulse of the previous stage is input to the counter 16 to the time when the next track cross pulse is input to the counter 16 as shown in FIG. 9 (E), it is regarded that the pulse dropout has occurred as indicated by the broken line in FIG. 9 (A). Hence, a correcting track cross pulse is output from the NOR circuit 13 and is counted by the pulse counter 14, so as to compensate for the dropout. Such an operation is repeated. The time $\Delta T_2$ described above is the time it takes for the initial value $N_{T2}$ to become zero by the count down or subtraction. If the track cross pulse is input within the time $\Delta T_2$, the counter 16 does not generate the track cross pulse and is initialized, so as to start the count down or subtraction.

The dropout of the track cross pulse occurs when the optical pickup 52 (scan beam) scans the address part of the track where no grooves are formed. Hence, the dropout does not occur when the optical pickup 52 moves at a low speed and occurs when the optical pickup 52 moves at a high speed. Therefore, by setting the initial value $N_{T2}$ of the counter 16 to zero from the MPU 17 to stop the down count when the optical pickup 52 is moved at the low speed, it is possible to prevent erroneous operation of the system.

In addition, the MPU 17 calculates the moving speed of the optical pickup 52 based on the counted value of the pulse counter 14. In other words, the moving speed is calculated based on the counted value of the pulse counter 14 within a predetermined time. Hence, the MPU 17 can judge whether the optical pickup 52 is moving at the low speed or the high speed, and set the initial value $N_{T2}$ of the counter 16. The MPU 17 similarly changes the initial value $N_{T1}$ of the counter 15 depending on whether the optical pickup 52 is moving at the low speed or the high speed, so as to prevent an erroneous operation of the system. Accordingly, the system can cope with a wide range of moving speeds of the optical pickup 52, that is, from the low speed to the high speed.

In this case, the MPU 17 stores the changes of initial values $N_{T1}$ and $N_{T2}$ in the respective buffers 18 and 19 every time the changes are made, and the MPU 17 does not output the set value for every pulse. Hence, the MPU 17 controls the VCM 53 which drives the optical pickup 52, and at the same time, can set the initial values $N_{T1}$ and $N_{T2}$. That is, the MPU 17 is used in common for the motor control and for the setting of the initial values $N_{T1}$ and $N_{T2}$.

The MPU 17 of this embodiment also carries out the access control operation shown in FIG. 3. In this case, however, the step S1 presets the moving quantity $N_M$ to the pulse counter 14 from the host controller 101 shown in FIG. 8 via the MPU 17. In other words, the counted value $N_{T1}$ ($N_T$) is the counted value of the pulse counter 14, and not the counted value of the counter circuit 55. In addition, $F(N_T)$ used in the step S6 is stored in the memory 102 shown in FIG. 8.

That is, the the MPU 17 can be used in common for the motor control and for the setting of the initial values $N_{T1}$ and $N_{T2}$, because the moving speed of the optical pickup 52 is already calculated in the access control operation. Thus, the initial values $N_{T1}$ can be set by simply inserting steps S21 through S24 shown in FIG. 10 after any of the steps S5, S6, S7, S8, S9 and S10 shown in FIG. 3.

Figure 10:
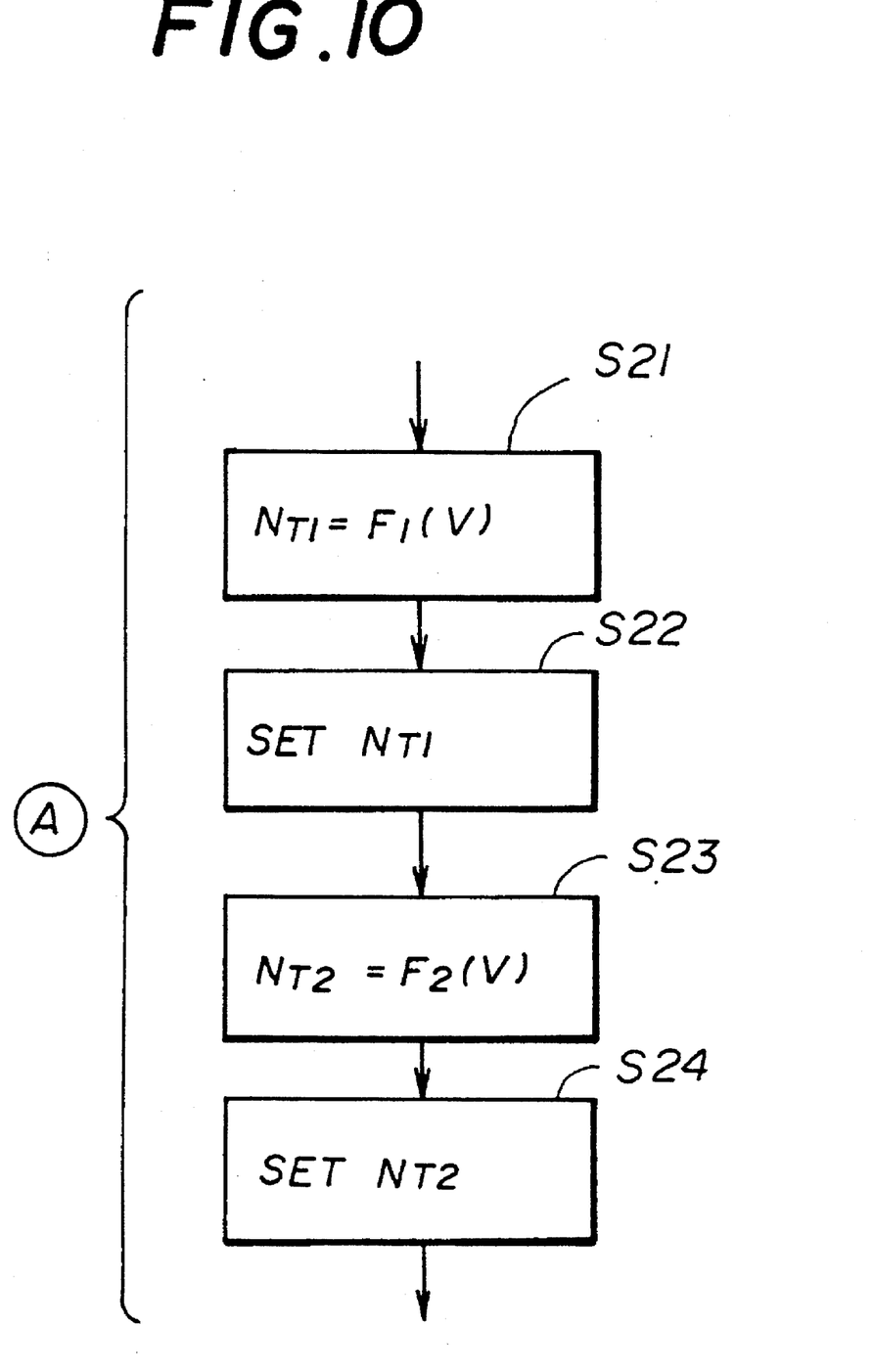
FIG. 10 is a flow chart for explaining the operation of a MPU of the first embodiment.

In FIG. 10, the step S21 calculates the initial value $N_{T1}$ based on $N_{T1}=F_1(V)$, where $F_1(V)$ is stored in the memory 102. The step S22 sets the calculated initial value $N_{T1}$ into the buffer 18. The step S23 calculates the initial value $N_{T2}$ based on $N_{T2}=F_2(V)$, where $F_2(V)$ is stored in the memory 102. The step S24 sets the calculated initial value $N_{T2}$ into the buffer 19.

The wait time ΔT of the step S3 shown in FIG. 3 is on the order of several hundred μs, and is 250 μs, for example. On the other hand, the operation time of the steps S21 through S24 is on the order of several μs, and is considerably small compared to the wait time ΔT. For this reason, if the wait time ΔT is made sufficiently small, the addition of the steps S21 through S24 virtually does not affect the operation time of the speed control operation.

In the first embodiment, the track cross pulse is generated every time the optical pickup 52 moves ½ track, that is, in response to both the rising and falling edges of the track error signal. However, it is possible to generate the track cross pulse in response to only one of the rising edge and falling edge of the track error signal.

Figure 11:
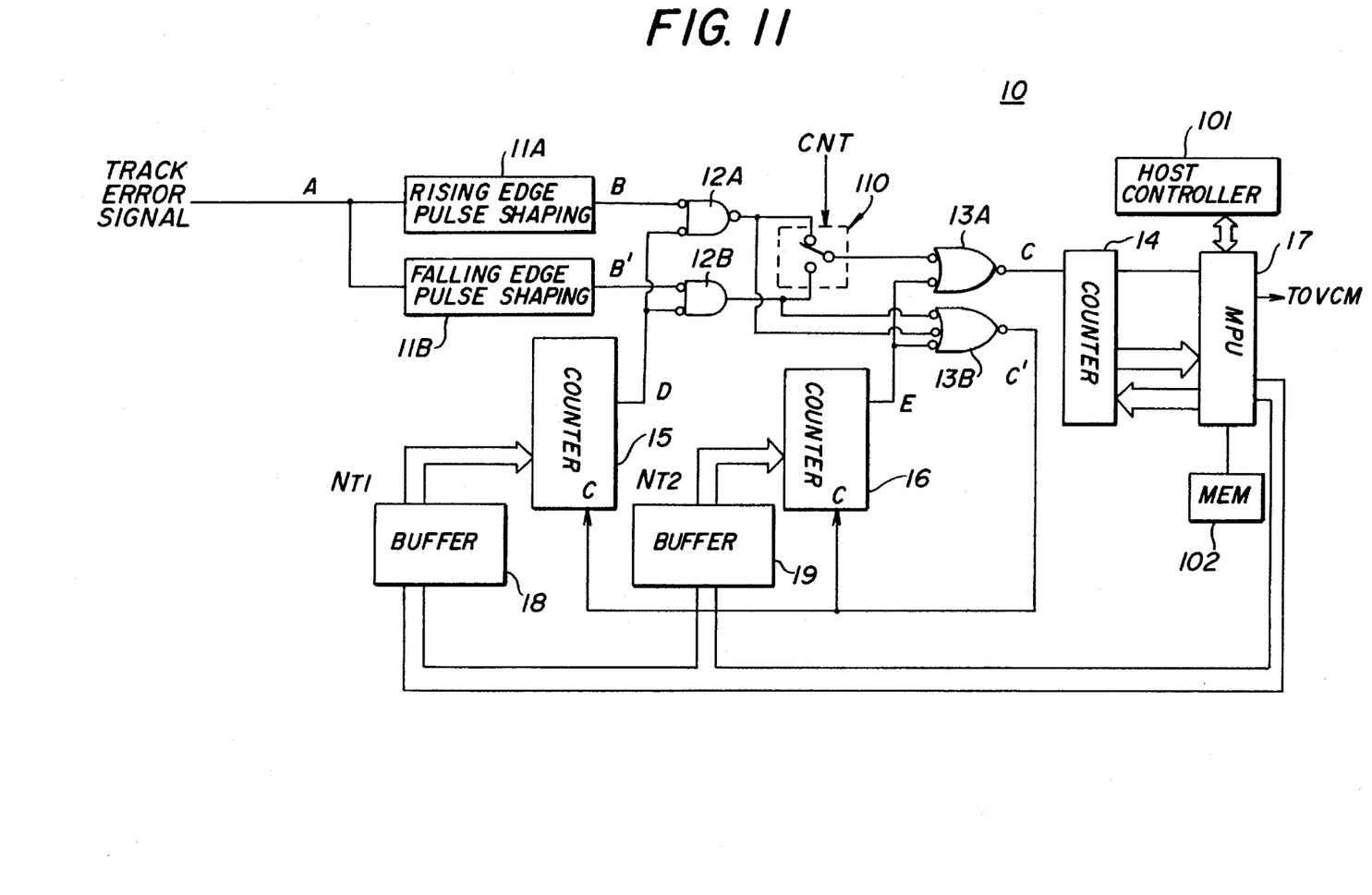
FIG. 11 is a system block diagram showing a second embodiment of the track retrieval system according to the present invention.
Figure 12:
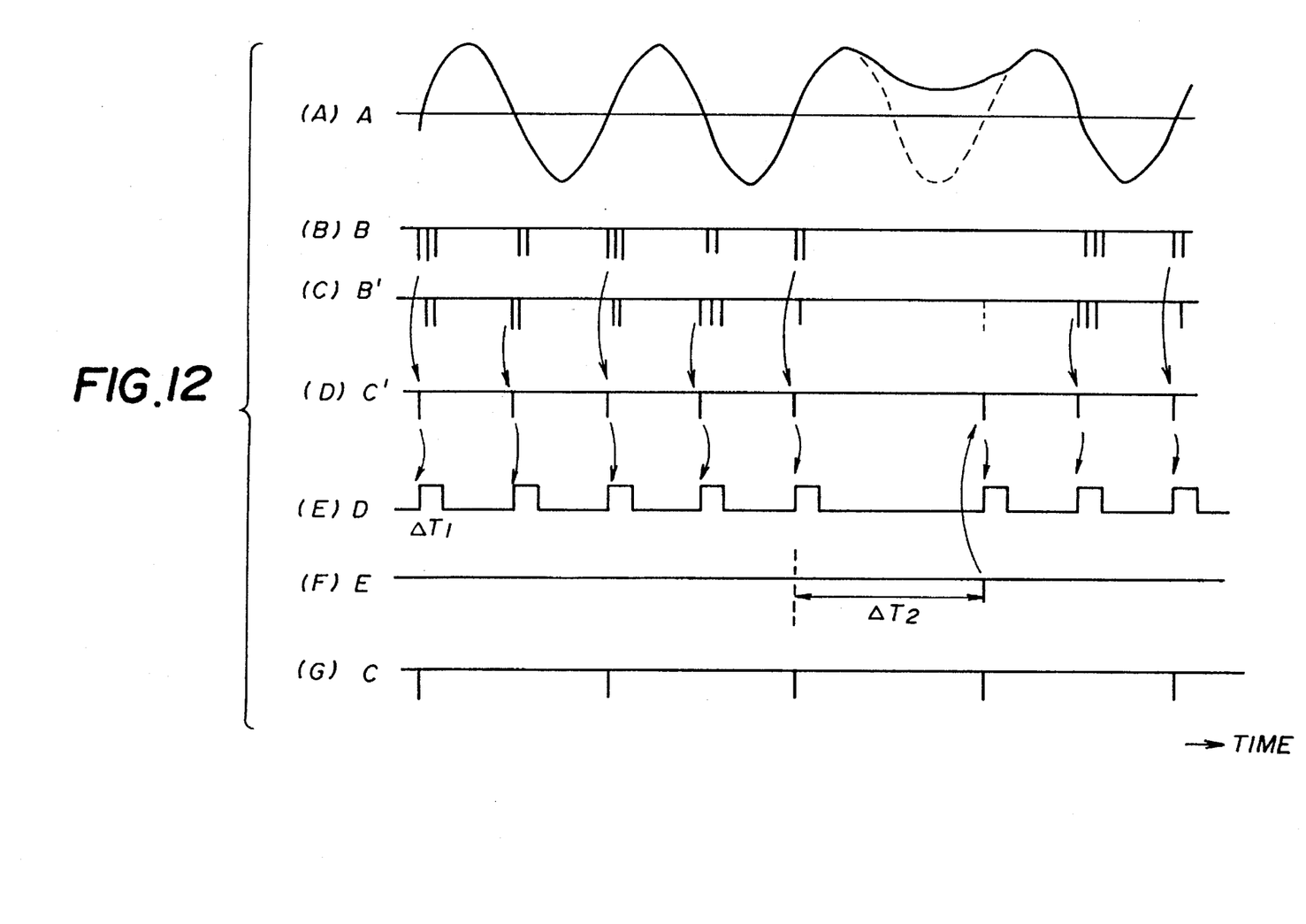
FIG. 12 is a time chart for explaining the operation of the second embodiment.

Next, a description will be given of a second embodiment of the track retrieval system according to the present invention, by referring to FIGS. 11 and 12. FIG. 11 shows the second embodiment, and FIG. 12 is a time chart for explaining the operation of this second embodiment. In FIG. 11, those parts which are the same as those corresponding parts in FIG. 8 are designated by the same reference numerals, and a description thereof will be omitted. According to this second embodiment, the track cross pulse is generated in response to only one of the rising edge and falling edge of the track error signal.

In the track retrieval system 10 shown in FIG. 11, a rising edge pulse shaping circuit 11A and a falling edge pulse shaping circuit 11B are provided in place of the pulse shaping circuit 11 shown in FIG. 8. NAND circuits 12A and 12B are provided in place of the NAND circuit 12 shown in FIG. 8, and NOR circuits 13A and 13B are provide in place of the NOR circuit 13 shown in FIG. 8. Furthermore, a switching circuit 110 is additionally provided.

The rising edge pulse shaping circuit 11A generates rising edge pulses B shown in FIG. 12 (B) in response to the rises at the zero crossings of the track error signal A shown in FIG. 12 (A). The falling edge pulse shaping circuit 11B generates falling edge pulses B' shown in FIG. 12 (C) in response to the falls at the zero crossings of the track error signal A. The rising edge pulses B are supplied to the NAND circuit 12A which also receives the output D of the counter 15 shown in FIG. 12 (E). On the other hand, the falling edge pulses B' are supplied to the NAND circuit 12B which also receives the output D.

Outputs of the NAND circuits 12A and 12B are supplied to the switching circuit 110 which selectively outputs one of the outputs in response to a control signal CNT. This control signal CNT determines which one of the rising edge pulse and the falling edge pulse is to be counted, and may be input via the MPU 17. The output of the switching circuit 110 is supplied to the NOR circuit 13A which also receives an output E of the counter 16 shown in FIG. 12 (F). An output C of the NOR circuit 13A shown in FIG. 12 (G) is supplied to the pulse counter 14.

On the other hand, the outputs of the NAND circuits 12A and 12B are also supplied to the NOR circuit 13B which also receives the output E of the counter 16. An output C' of the NOR circuit 13B shown in FIG. 12 (D) is supplied to the count terminals C of the counters 15 and 16.

As may be seen from FIG. 12 (B) and (C), the chattering may cause both the rising edge pulses and the falling edge pulses to be generated. But the rising edge pulse is generated at the rise of the track error signal before the falling edge pulse is generated, and the falling edge pulse is generated at the fall of the track error signal before the rising edge pulse is generated. For this reason, it is possible to positively count one of the rising edge pulse and the falling edge pulse, by taking measures so that the counters 15 and 16 (that is, the masking timers) operate in response to either one of the rising and falling edge pulses.

Next, a description will be given of the effects obtainable by the above described embodiments, in comparison with the Japanese Laid-Open Patent Applications No. 1-98169 and No. 63-10382.

Compared to the Japanese Laid-Open Patent Application No. 1-98169, the described embodiments can simplify the construction of the system because the the MPU 17 is used in common for the motor control and for the setting of the initial values $N_{T1}$ and $N_{T2}$. In the Japanese Laid-Open Patent Application No. 1-98169, it is either impossible to use in common the MPU which controls the VCM or the control program becomes complex due to the interrupt processing even if were possible to use the MPU in common.

In addition, in the Japanese Laid-Open Patent Application No. 1-98169, an error is introduced in the corrected pulse which compensates for the pulse dropout if the predicted moving speed of the optical pickup is slower than the actual moving speed. However, according to the described embodiments, the masking is made by the counter 16 before and after the corrected track cross pulse. Hence, the described embodiments can set the masking time with flexibility, and a counting error will not occur.

When compared to the Japanese Laid-Open Patent Application No. 63-10382, the integrator is reset depending on the moving speed detection, independently of the track error signal. For this reason, the error of the moving speed detection is easily accumulated. On the other hand, according to the described embodiments, the error will not be accumulated because the initialization is made by the track cross pulse. In addition, there is no need to provide a speed detector, and the circuit can be made in the form of the IC with ease.

Further, the present invention is not limited to these embodiments, but various variations and modifications may be made without departing from the scope of the present invention.

What is claimed is:

1. A track retrieval system for retrieving a track of an optical disk based on track cross pulses which correspond to a number of tracks scanned by a scan beam, said track retrieval system comprising:

pulse shaping means for generating a pulse at a zero-crossing of a track error signal which is dependent on a tracking error of the scan beam relative to the track;

masking means, coupled to said pulse shaping means, for outputting track cross pulses by masking an output of said pulse shaping means for a predetermined time after the pulse is output from said pulse shaping means, so that pulses generated by said pulse shaping means within the predetermined time due to chattering are eliminated, said predetermined time being determined based upon a moving speed of the scan beam;

counter means, coupled to said masking means, for counting the track cross pulses output from said masking means and for outputting a counted value; and control means, coupled to said counter means, for setting the predetermined time in said masking means based on the moving speed of the scan beam which is calculated from the counted value output from said counter means, said control means also controlling the moving speed of the scan beam.

2. The track retrieval system as claimed in claim 1, wherein said pulse shaping means generates a zero crossing pulse only in response to a rising edge at a zero crossing of the track error signal.

3. The track retrieval system as claimed in claim 1, wherein said pulse shaping means generates a zero crossing pulse only in response to a falling edge at a zero crossing of the track error signal.

4. The track retrieval system as claimed in claim 1, wherein said pulse shaping means includes means for generating a first pulse in response to a rise at a zero crossing of the track error signal and a second pulse in response to a fall at a zero crossing of the track error signal, and means for selectively outputting one of the first pulse and the second pulse as the output pulse of said pulse shaping means.

5. A track retrieval system for retrieving a track of an optical disk based on track cross pulses which correspond to a number of tracks scanned by a scan beam, said track retrieval system comprising:

pulse shaping means for generating a pulse at a zero-crossing of a track error signal which is dependent on a tracking error of the scan beam relative to the track;

masking means, coupled to said pulse shaping means, for outputting track cross pulses by masking an output of said pulse shaping means for a predetermined time after the pulse is output from said pulse shaping means, so that pulses generated by said pulse shaping means within the predetermined time due to chattering are eliminated, said predetermined time being determined based upon a moving speed of the scan beam, said masking means including means for passing only a first pulse output from said pulse shaping means to said counter means at each zero crossing of the track error signal;

counter means, coupled to said masking means, for counting the track cross pulses output from said masking means and for outputting a counted value; and control means, coupled to said counter means, for setting the predetermined time in said masking means based on the moving speed of the scan beam which is calculated from the counted value output from said counter means, said control means also controlling the moving speed of the scan beam.

6. The track retrieval system as claimed in claim 1, wherein said masking means includes a time counter for counting down the predetermined time set from said control means, and a gate circuit for passing the output pulse of said pulse shaping means to said counter means based on a counted value of the time counter.

7. A track retrieval system for retrieving a track of an optical disk based on track cross pulses which correspond to a number of tracks scanned by a scan beam, said track retrieval system comprising:

pulse shaping means for generating a pulse at a zero-crossing of a track error signal which is dependent on a tracking error of the scan beam relative to the track;

correcting means, coupled to said pulse shaping means, for outputting a track cross pulse if said pulse shaping means outputs no pulse within a predetermined time, so that a pulse dropout of the track cross pulse is compensated, said predetermined time being determined based upon a moving speed of the scan beam;

counter means, coupled to said pulse shaping means and said correcting means, for counting the track cross pulses output from said pulse shaping means and said correcting means and for outputting a counted value; and control means, coupled to said counter means, for setting the predetermined time in said correcting means based on the moving speed of the scan beam which is calculated from the counted value output from said counter means, said control means also controlling the moving speed of the scan beam.

8. The track retrieval system as claimed in claim 7, wherein said pulse shaping means generates a zero crossing pulse only in response to a rising edge at a zero crossing of the track error signal.

9. The track retrieval system as claimed in claim 7, wherein said pulse shaping means generates a zero crossing pulse only in response to a falling edge at a zero crossing of the track error signal.

10. The track retrieval system as claimed in claim 7, wherein said pulse shaping means includes means for generating a first pulse in response to a rise at a zero crossing of the track error signal and a second pulse in response to a fall at a zero crossing of the track error signal, and means for selectively outputting one of the first pulse and the second pulse as the output pulse of said pulse shaping means.

11. The track retrieval system as claimed in claim 7, wherein said correcting means includes a time counter for counting down the predetermined time set from said control means, and a gate circuit for passing the output pulse of said pulse shaping means to said counter means based on a counted value of the time counter.

12. The track retrieval system as claimed in claim 7, wherein said correcting means is reset if said pulse shaping means outputs a pulse within the predetermined time.

13. A track retrieval system for retrieving a track of an optical disk based on track cross pulses which correspond to a number of tracks scanned by a scan beam, said track retrieval system comprising:

pulse shaping means for generating a pulse at a zero-crossing of a track error signal which is dependent on a tracking error of the scan beam relative to the track;

masking means, coupled to said pulse shaping means, for outputting track cross pulses by masking an output of said pulse shaping means for a first predetermined time after the pulse is output from said pulse shaping means, so that pulses generated by said pulse shaping means within the first predetermined time due to chattering are eliminated;

correcting means, coupled to said pulse shaping means, for outputting a track cross pulse if said pulse shaping means outputs no pulse within a second predetermined time, so that a pulse dropout of the track cross pulse is compensated, wherein the first and second predetermined times are determined based upon a moving speed of the scan beam;

counter means, coupled to said masking means and said correcting means, for counting the track cross pulses output from said masking means and for outputting a counted value; and control means, coupled to said counter means, for setting the first predetermined time in said masking means and the second predetermined time in said correcting means, based on a moving speed of the scan beam which is calculated from the counted value output from said counter means, said control means also controlling the moving speed of the scan beam.

14. The track retrieval system as claimed in claim 13, wherein said pulse shaping means generates a zero crossing pulse only in response to a rising edge at a zero crossing of the track error signal.

15. The track retrieval system as claimed in claim 13, wherein said pulse shaping means generates a zero crossing pulse only in response to a falling edge at a zero crossing of the track error signal.

16. The track retrieval system as claimed in claim 13, wherein said pulse shaping means includes means for generating a first pulse in response to a rise at a zero crossing of the track error signal and a second pulse in response to a fall at a zero crossing of the track error signal, and means for selectively outputting one of the first pulse and the second pulse as the output pulse of said pulse shaping means.

17. The track retrieval system as claimed in claim 13, wherein said masking means includes means for passing only a first pulse output from said pulse shaping means to said counter means at each zero crossing of the track error signal.

18. The track retrieval system as claimed in claim 13, wherein said masking means includes a time counter for counting down the first predetermined time set from said control means, and a gate circuit for passing the output pulse of said pulse shaping means to said counter means based on a counted value of the time counter.

19. The track retrieval system as claimed in claim 13, wherein said correcting means includes a time counter for counting down the second predetermined time set from said control means, and a gate circuit for passing the output track cross pulse of said masking means to said counter means based on a counted value of the time counter.

20. The track retrieval system as claimed in claim 13, wherein said correcting means is reset if said pulse shaping means outputs a pulse within the second predetermined time.

21. A track retrieval system as recited in claim 1, wherein said masking means comprises a NAND circuit.

22. A track retrieval system as recited in claim 7, wherein said correcting means comprises a NOR circuit.

* * * * *